(12) United States Patent
Williams

(10) Patent No.: US 8,510,049 B2
(45) Date of Patent: Aug. 13, 2013

(54) MAXIMUM ENTROPY APPLICATION METHODS AND SYSTEMS

(75) Inventor: Michael John Williams, Ely (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 639 days.

(21) Appl. No.: 12/552,159

(22) Filed: Sep. 1, 2009

(65) Prior Publication Data

US 2011/0054797 A1   Mar. 3, 2011

(51) Int. Cl.
*G01V 1/40* (2006.01)
*G06F 17/18* (2006.01)
*G06G 7/48* (2006.01)

(52) U.S. Cl.
USPC .................. 702/6; 702/179; 702/181; 703/10

(58) Field of Classification Search
USPC ................................ 702/6, 179, 181; 703/10
See application file for complete search history.

(56) References Cited

U.S. PATENT DOCUMENTS

| 6,106,561 | A | 8/2000 | Farmer | |
|---|---|---|---|---|
| 7,231,818 | B2 | 6/2007 | Sheng | |
| 7,369,979 | B1 | 5/2008 | Spivey | |
| 7,448,262 | B2 | 11/2008 | Sheng | |
| 7,532,984 | B2 | 5/2009 | Syngaevsky | |
| 2002/0013687 | A1* | 1/2002 | Ortoleva | 703/10 |
| 2002/0120429 | A1 | 8/2002 | Ortoleva | |
| 2008/0077371 | A1* | 3/2008 | Yeten et al. | 703/10 |
| 2008/0243447 | A1 | 10/2008 | Roggero | |
| 2010/0138368 | A1* | 6/2010 | Stundner et al. | 706/12 |

FOREIGN PATENT DOCUMENTS

| GB | 2398878 | 9/2004 |
|---|---|---|
| GB | 2465861 | 6/2010 |
| WO | 2002/47011 | 6/2002 |

OTHER PUBLICATIONS

TNO Company—TNO.nl, "Production forecasting with uncertainty quantification", May 2007, 4 pages.*
Archiving Geological and Reservoir Simulation Models—A Consultation Document, UK Department of Trade and Industry, 2004.
Erbas et al., "How Does Sampling Strategy Affect Uncertainty Estimations?", Oil and Gas Science and Technology, Rev. IFP, vol. 62 No. 2, pp. 155-167, Edinburgh, UK, 2007.
King et al., "Optimal Coarsening of 3D Reservoir Models for Flow Simulation", SPE 95759, Oct. 9-12, 2005, Dallas, Texas.
Tavassoli et al., "Errors in History Matching" SPE 86883, pp. 352-361, SPE Journal, Sep. 2004, Imperial College, London.
Williams et al., "Top-Down Reservoir Modelling", SPE 89974, pp. 1-8, Sep. 26-29, 2004, Houston, Texas.

* cited by examiner

*Primary Examiner* — Alexander H Taningco
*Assistant Examiner* — L. Anderson
(74) *Attorney, Agent, or Firm* — Lam Nguyen; Rodney Warfford

(57) ABSTRACT

Techniques for a maximum entropy approach to assigning probabilities, including those used in multiple realization history matching systems and methods, are disclosed. For example, in one embodiment, a method includes obtaining one or more available sample values Yi associated with a reservoir; computing a maximum entropy assignment λ of one or more discrete probabilities Pi(Yi) associated with each of the one or more available sample values Yi, where each discrete probability Pi(Yi) represents a probability that one or more variables Y will take a set of particular values Yi; and performing at least one determination regarding the reservoir using the maximum entropy assignment λ, including approximating a continuous probability distribution P(Y) using a sum of probability distributions Pi(Yi)+/−λ.

16 Claims, 9 Drawing Sheets

MAXIMUM ENTROPY APPLICATION METHODS AND SYSTEMS

BACKGROUND

Multiple realization history matching has revolutionized the approach to reservoir simulation studies in the field of hydrocarbon fuel production. In general, multiple realization history matching attempts to approximate an idealized problem that can be represented by Bayes' Theorem. Examples of conventional multiple realization history matching methods and systems include those described, for example, in U.S. Pat. No. 7,532,984 issued to Syngaevshy, U.S. Pat. No. 7,448,262 issued to Sheng et al., and U.S. Patent Application Publication No. 2008/0077371 by Yeten et al.

A problem remains, however, that due to the relatively large number of input parameters involved in many multiple realization history matching problems, including reservoir studies, even with huge advances in computing power, the existing approaches (which rely on sampling ever more realizations) typically cannot fully populate the probability distributions that they claim to be using in their solution. Conventional approaches for dealing with undesirably few available samples include (1) taking the samples and tweaking them to match the production history (e.g. commercial software for this includes MEPO by Scandpower Petroleum Technology, and SimOpt from Schlumberger Information Solutions (SIS)), (2) interpolating a function through the available samples and then sampling that function instead of running a simulator (e.g. available commercial software includes COUGAR from Innovation Energie Environnement), and (3) ranking the available realizations using, for example, a root-mean-square fit to the data (e.g. using a variety of suitable applications, including Petrel-RE available from SIS). Although desirable results are being achieved using such conventional systems and methods, there is room for improvement.

SUMMARY

Techniques for a maximum entropy approach to assigning probabilities, including those used in multiple realization history matching systems and methods, are disclosed. For example, in one embodiment, a method includes obtaining one or more available sample values Yi associated with a reservoir; computing a maximum entropy assignment $\lambda$ of one or more discrete probabilities Pi(Yi) associated with each of the one or more available sample values Yi, where each discrete probability Pi(Yi) represents a probability that one or more variables Y will take a set of particular values Yi; and performing at least one determination regarding the reservoir using the maximum entropy assignment $\lambda$, including approximating a continuous probability distribution P(Y) using a sum of probability distributions Pi(Yi)+/−$\lambda$. In various alternate embodiments, the performing of at least one determination regarding the reservoir may include performing a multiple realization history matching, a forecast of one or more variables, or a development of at least part of a field development plan. These and other aspects in accordance with the teachings of the present disclosure are described more fully below.

BRIEF DESCRIPTION OF THE DRAWINGS

Various embodiments and aspects may be described below with reference to the accompanying figures.

DETAILED DESCRIPTION

The present disclosure is directed to methods and systems that use a maximum entropy approach to assigning probabilities. Such methods and systems are suitable for use in a variety of problems, including multiple realization history matching. In general, embodiments of systems and methods in accordance with the present disclosure may advantageously use a maximum entropy approach to assigning probabilities, enabling the most ambiguous form of probability assignment to be provided under constraints. Such embodiments may therefore allow analysts to correctly accommodate the limited number of realizations that are able to be run, and to properly assign ignorance of the values that lie between, as described more fully below.

In the following disclosure, one or more exemplary environments are described in which embodiments in accordance with the teachings of the present disclosure may be implemented. Following the description of exemplary environments, details of specific embodiments of methods and systems in accordance with the teachings of the present disclosure are provided.

Exemplary Environments

Figure 1:
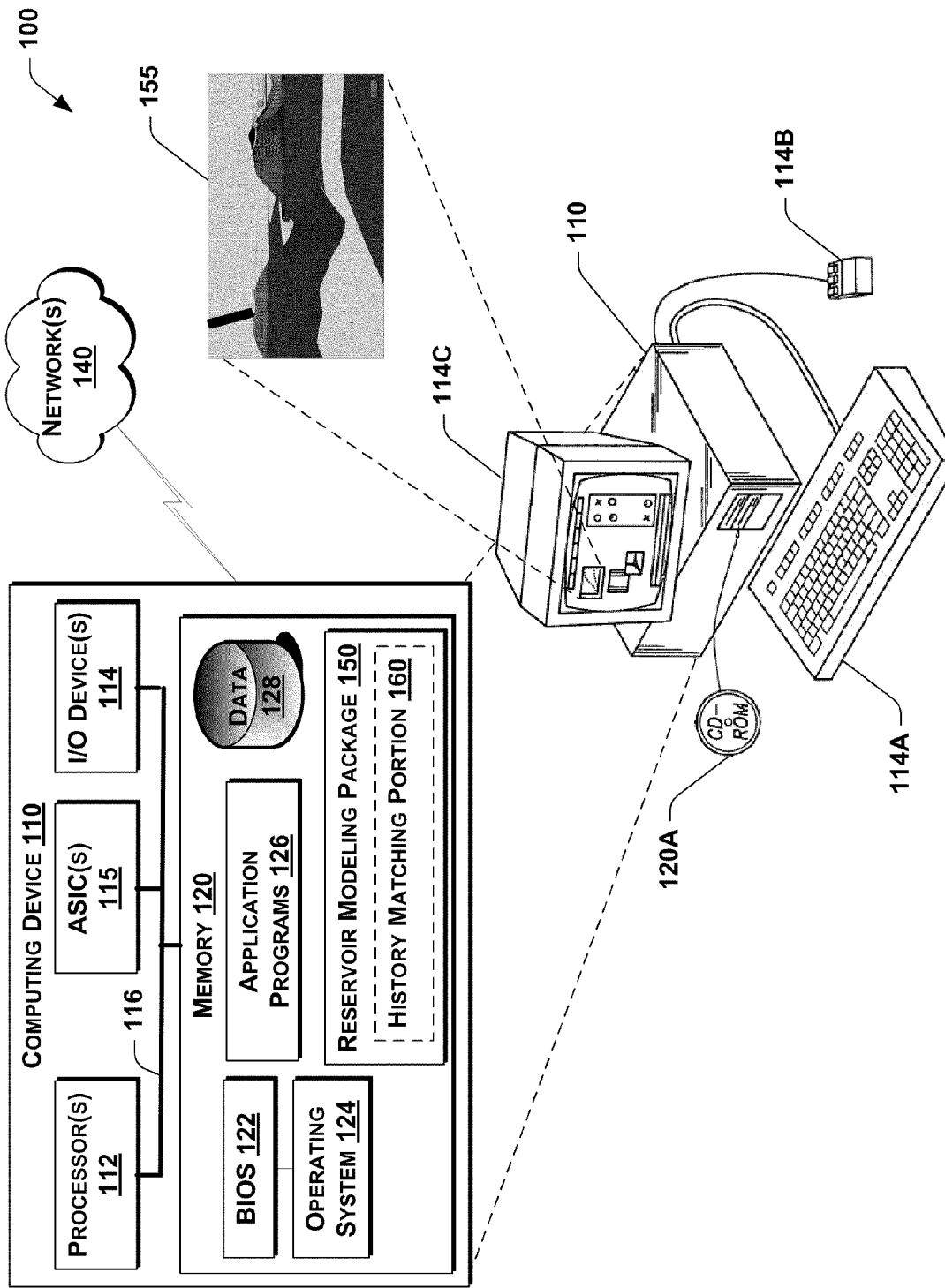
FIG. 1 illustrates an exemplary environment in which various embodiments of methods and systems in accordance with the teachings of the present disclosure can be implemented.

Systems and methods for multiple realization history matching in accordance with the teachings of the present disclosure may be implemented in a variety of computational environments. For example, FIG. 1 illustrates an exemplary environment 100 in which various embodiments of systems and methods in accordance with the teachings of the present disclosure can be implemented. In this implementation, the environment 100 includes a computing device 110 configured in accordance with the teachings of the present disclosure. In some embodiments, the computing device 110 may include one or more processors 112 and one or more input/output (I/O) devices 114 coupled to a memory 120 by a bus 116. One or more Application Specific Integrated Circuits (ASICs) 115 may be coupled to the bus 116 and configured to perform one or more desired functionalities described herein. In the implementation shown in FIG. 1, a history matching portion 160 that is configured in accordance with the teachings of the present disclosure resides within the memory 120 of the computing device 110.

The computing device 110 may further include a reservoir modeling package 150. The reservoir modeling package 150 (and thus the computing device 110) may be configured to perform computational modeling or analyses of hydrocarbon production operations from subterranean reservoirs, depicted as a reservoir simulation image 155 in FIG. 1. As depicted in FIG. 1, the reservoir modeling package 150 may include the history matching portion 160 that is configured in accordance with the teachings of the present disclosure. Operational aspects of the history matching portion 160 in accordance with the teachings of the present disclosure are described more fully below.

In some embodiments, the history matching portion 160 may be integrated with the reservoir modeling package 150, while in other embodiments, the history matching portion 160 may be separate from the reservoir modeling package 150, and may reside within or be distributed among one or more other components or portions of the computing device 110 (e.g. separately within the memory 120, application programs 126, etc.) or even elsewhere within the environment 100 (e.g. within the network 140). In further embodiments, one or more aspects of the history matching functionality described herein may be distributed throughout the environment 100, and may reside, for example, in one or more of the processors 112, the I/O devices 114, the ASICs 115, the memory 120 (e.g. one or more application programs 126, reservoir modeling package 150, etc.), or in one or more of the networks 140.

The one or more processors 112 may be composed of any suitable combination of hardware, software, or firmware to provide the desired functionality described herein. Similarly, the I/O devices 114 may include any suitable I/O devices, including, for example, a keyboard 114A, a cursor control device (e.g. mouse 114B), a display device (or monitor) 114C, a microphone, a scanner, a speaker, a printer, a network card, or any other suitable I/O device. In some embodiments, one or more of the I/O components 114 may be configured to operatively communicate with one or more external networks 140, such as a cellular telephone network, a satellite network, an information network (e.g. Internet, intranet, cellular network, cable network, fiber optic network, LAN, WAN, etc.), an infrared or radio wave communication network, or any other suitable network. The system bus 116 of the computing device 110 may represent any of the several types of bus structures (or combinations of bus structures), including a memory bus or memory controller, a peripheral bus, an accelerated graphics port, and a processor or local bus using any of a variety of bus architectures.

The memory 120 may include one or more computer-readable media configured to store data and/or program modules for implementing the techniques disclosed herein. For example, the memory 120 may host (or store) a basic input/output system (BIOS) 122, an operating system 124, one or more application programs 126, and program data 128 that can be accessed by the processor 112 for performing various functions disclosed herein.

In the following description, various techniques may be described in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media may include, but is not limited to, random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information and which can be accessed by the computing device 110. Combinations of any of the above should also be included within the scope of computer readable media.

Moreover, the computer-readable media included in the system memory 120 can be any available media that can be accessed by the computing device 110, including removable computer storage media (e.g. CD-ROM 120A) or non-removeable storage media. Computer storage media may include both volatile and nonvolatile media (or persistent and non-persistent) implemented in any method or technology for storage of information such as computer-readable instructions, data structures, program modules, or other data. Generally, program modules executed on the computing device 110 may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

Referring again to FIG. 1, it will be appreciated that the computing device 110 is merely exemplary, and represents only one example of many possible environments (e.g. computing devices, architectures, etc.) that are suitable for use in accordance with the teachings of the present disclosure. Therefore, the computing device 110 shown in FIG. 1 is not intended to suggest any limitation as to scope of use or functionality of the computing device and/or its possible architectures. Neither should computing device 110 be interpreted as having any dependency or requirement relating to any one or combination of components illustrated in the example computing device 110.

Figure 2:
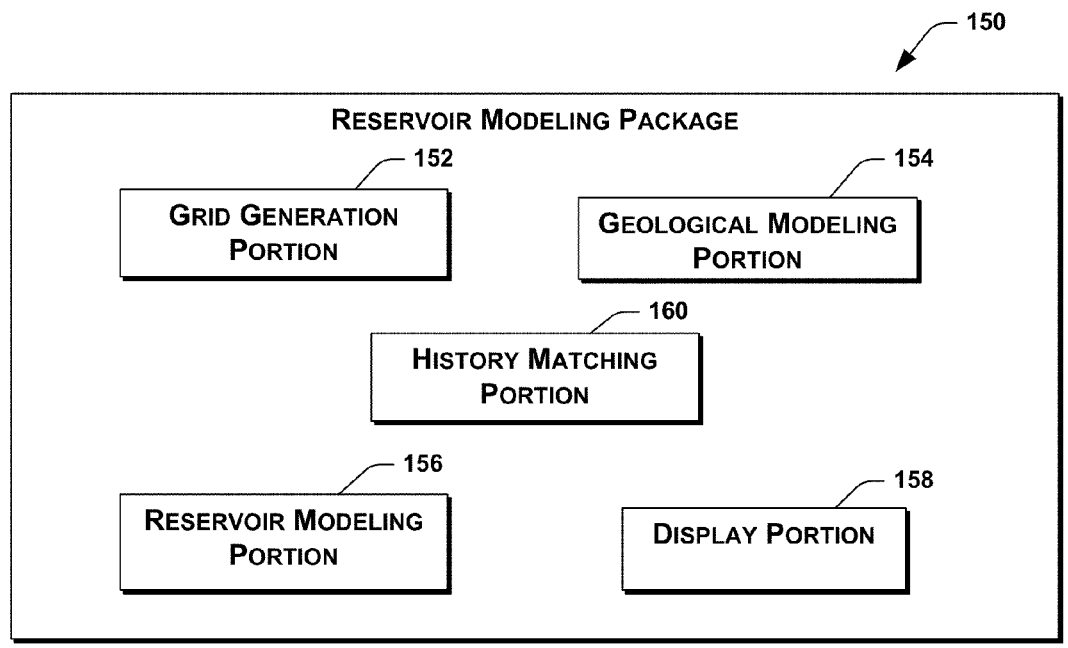
FIG. 2 is a schematic view of an exemplary reservoir modeling package in accordance with the teachings of the present disclosure.

FIG. 2 is a schematic view of the exemplary reservoir modeling package 150 of FIG. 1 in accordance with the teachings of the present disclosure. In some implementations, the reservoir modeling package 150 may include a grid generation portion 152, a geological modeling portion 154, a reservoir modeling portion 156, a display portion 158, and a history matching portion 160. As noted above, the history matching portion 160 may be configured in accordance with the teachings of the present disclosure.

In general, unless otherwise stated herein, one or more of the components of the reservoir modeling package 150 may be variously combined with one or more other components, or eliminated, to provide further possible embodiments of reservoir modeling packages in accordance with the teachings of the present disclosure. For example, in some embodiments, the grid generation portion 152 may be part of the geological modeling portion 154. Similarly, the display portion 158 may be part of the reservoir modeling portion 156, or the geological modeling portion 154, or any other portion of the reservoir modeling package 150. In further embodiments, either the grid generation portion 152, or the geological modeling portion 154, or both, may be separate from the reservoir modeling functionalities (i.e. eliminated from FIG. 2).

Also, unless otherwise stated herein, one or more of the components of the reservoir modeling package 150 other than the history matching portion 160 may include (or be composed of) conventional components. For example, in some implementations, the geological modeling portion 154 may be a software package known as Petrel®, which is a software package available from Schlumberger Technology Corporation. Similarly, in some implementations, the grid generation portion 152 may be a grid generation package known as Flogrid®, or Petragrid, also available from Schlumberger. In some embodiments, the reservoir modeling portion 156 may be a conventional software package known as Eclipse®, which is another software package available from Schlumberger. Other conventional software tools may also be used in the reservoir modeling package 150, including those simulation, modeling, and display tools available from or produced by, for example, Gemini Solutions, Inc., BP, Chevron, Roxar, Texas A&M University, and any other suitable components.

In general, the operational aspects of the grid generation portion 152, the geological modeling portion 154, the reservoir modeling portion 156, and the display portion 158 may be accomplished using generally known techniques and components, and therefore, will not be described in detail herein. Examples of suitable conventional techniques employed by these components include but are not limited to those described, for example, in the following available literature: "Petrel Version 2007.1—Petrel VR Configuration and User Guide," by Schlumberger Technology Corporation (2007); "Archiving Geological and Reservoir Simulation Models—A Consultation Document," UK Department of Trade and Industry, (2004); "Optimal Coarsening of 3D Reservoir Models for Flow Simulation," by King et al., SPE (Society of Petroleum Engineering) 95759 (October 2005); "Top-Down Reservoir Modeling," by Williams et al., SPE 89974 (September 2004); and U.S. Pat. No. 6,106,561 issued to Farmer and assigned to Schlumberger Technology Corporation. Operational aspects of the history matching portion 160 in accordance with the teachings of the present disclosure, however, are described in the following section.

Exemplary Processes Involving the Maximum Entropy Application

In this section, exemplary processes in accordance with the teachings of the present disclosure are described, including processes for multiple realization history matching. A description of the underlying mathematical formulation of a maximum entropy application process is initially described, followed by a description of one or more exemplary processes that may be implemented using the maximum entropy application.

As indicated above, multiple realization history matching attempts to approximate an idealized problem that can be represented by Bayes' Theorem, as shown, for example, in the following Equation (1):

$$P(X \mid D, I) = \frac{P(D \mid X, I)P(X \mid I)}{P(D \mid I)} \quad (1)$$

where P( ) are probabilities, D are some observations (or measured or sensed values) (e.g. flow rates, Bottom Hole Pressures (BHPs), etc.), X represents the inputs (e.g. permeabilities, facies models etc.) to our modeling, and I represents all the knowledge available at the start.

To compare X to D we need to convert between the inputs and their representation as ideal measurements, which can be denoted as F=f(X). In some embodiments, an individual transform from some particular set of inputs $X_i$ into idealized data $F_i$ may be performed. For example, in some particular embodiments, a reservoir simulation package may be used to perform the individual transform from some particular set of inputs $X_i$ into idealized data $F_i$.

Next, for the idealized problem, the continuous prior probabilities are replaced with a set of samples $X_i$ (e.g. a comb function). Similarly, the continuous likelihoods are replaced with a calculation of the probability of the observations D given the discrete set of simulation results $F_i$ (e.g. again a comb function). As the number of samples increases, the approximation afforded by these operations improves, however, there are typically an undesirably few number of available samples to provide a satisfactory approximation without performing additional compensating operations as mentioned in the Background section above. Embodiments of systems and methods in accordance with the teachings of the present disclosure advantageously provide satisfactory approximations despite the inadequate number of available samples, as described more fully below.

We can only ever take a finite number of samples, Yi, and whilst we may be able to determine their probabilities Pi(Yi), we would like to approximate the ideal case of infinite sampling Y and its corresponding continuous probability distribution P(Y). Therefore, in accordance with the teachings of the present disclosure, a technique which may be termed a maximum entropy assignment of probabilities (or Maximum Entropy Assignment) is employed which uses: a discrete set of probabilities Pi(Yi), where Pi is the probability that the variables Y take the particular values Yi; an additional set of constraints, Ymax and Ymin which are limiting values of the variables Y; and (optionally) some expectation <Y> and standard deviation σY. In general, Y may be a vector of j=1, ..., n different variables. It is possible to restrict Y to the case of n=1, and an example embodiment described below does this.

In some embodiments, each probability Pi may be considered to be a Gaussian distribution with an unknown standard deviation $\lambda_j$, which may be the same for all the probabilities i corresponding to a particular variable j. In the following discussion, we consider the case where n=1, and thus, the subscript j will be dropped for clarity.

The Maximum Entropy Assignment is then defined as the determination of λ such that the following Equation (2) is a maximum:

$$S_Y = -\Sigma_i P_i(Y_i) \ln(P_i(Y_i))  \quad (2)$$

This assignment returns large value of λ when the sampling Pi(Yi) of the probability distribution P(Y) is sparse. When the sampling of P(Y) is dense (for example when there are many measurements $Y_i$), the returned value of λ is correspondingly small. In analyzing the probability distribution P(Y) we consider the continuous distribution constructed by summing the Gaussian distributions Pi(Yi)±λ rather than the comb function representation that is the sum of the original Pi(Yi), clearly as λ→0 (the case of very dense sampling) the Gaussian representation approaches the original sum.

Thus, in accordance with the teachings of the present disclosure, history matching and reservoir forecasting problems may be reduced to instances of the application of the Maximum Entropy Assignment. More specifically, using probabilities assigned by the Maximum Entropy Assignment, the handling of the probability of the individual reservoir models may be achieved by storing a current estimate of a peak probability of that particular model. The complete continuous probability distribution can be later reconstructed by again performing the maximization using Equation (2). In the following disclosure, a particular embodiment of a method for updating probabilities is given with reference to a familiar case of history matching. In addition, as is described later, methods for handling probabilities may also be used in a number of different ways in various alternate embodiments in accordance with the teachings of the present disclosure.

Figure 3:
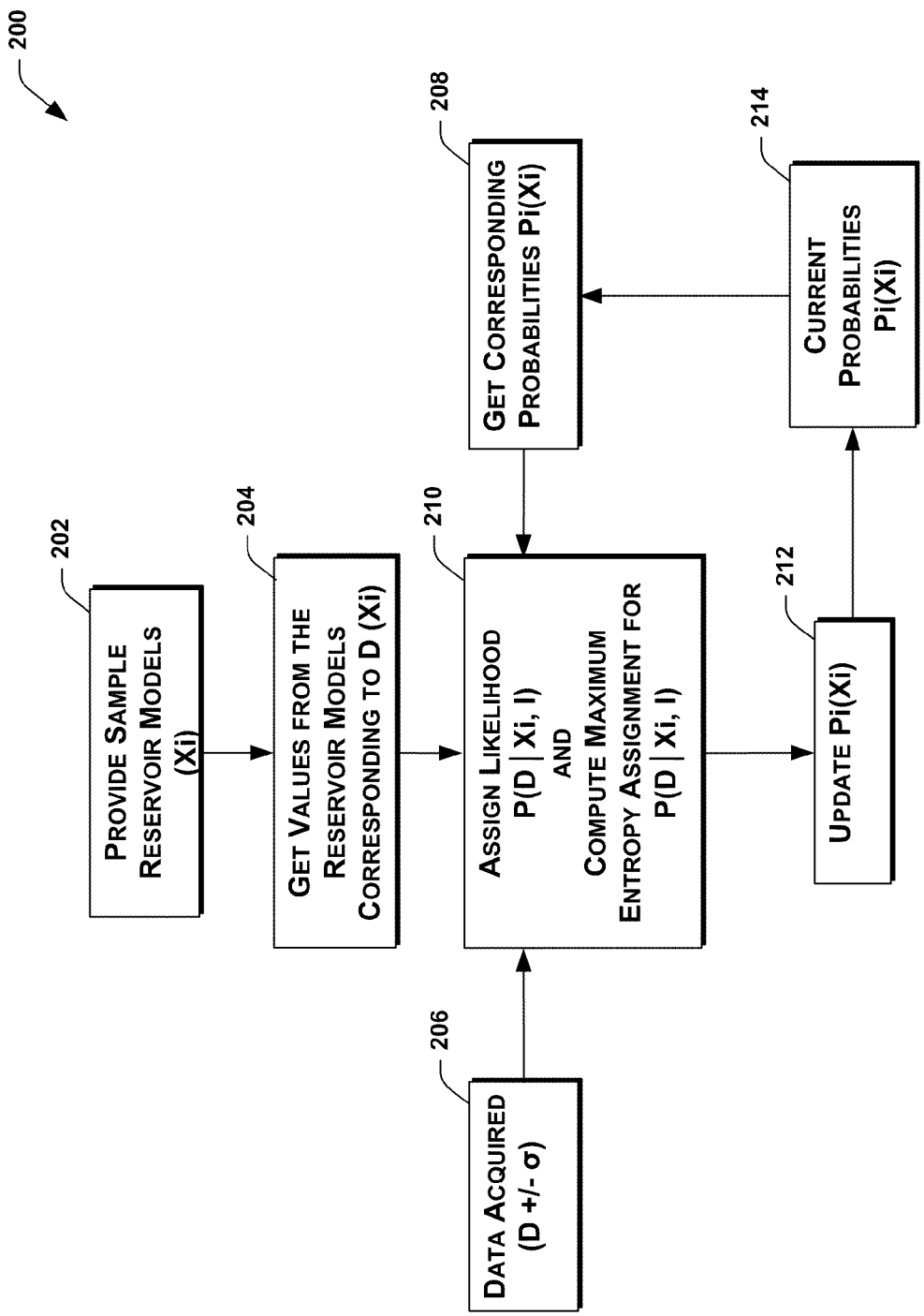
FIG. 3 is a flowchart of an exemplary method for updating probabilities in accordance with the teachings of the present disclosure.

For example, FIG. 3 is a flowchart of an exemplary method for updating probabilities 200 in accordance with the teachings of the present disclosure. In some embodiments, the method 200 may be a stand-alone process, while in further embodiments the method 200 may be part of a broader simulation or modeling process.

In this embodiment, the method 200 includes providing a plurality of samples of reservoir models (Xi) at 202. At 204, values are obtained from the reservoir models (Xi) corresponding to D(Xi) where, as noted above, D are some observations (or measured or sensed values) (e.g. flow rates, Bottom Hole Pressures (BHPs), etc.), and X represents the inputs (e.g. permeabilities, facies models, etc.) to our modeling. At 206, additional acquired data and/or observations along with corresponding uncertainties (D+/−σ) are obtained or provided. Typically, some transformation between the information from the models and the form of the additionally acquired data may be applied (e.g. using a reservoir simulator).

As further shown in FIG. 3, at 208, corresponding current probabilities are obtained. The assignment for P(X|I) is the current probabilities of the individual reservoir models assigned at the values corresponding to the form of D (e.g. in the n=1 case this could be a single value, the well production rate for a particular well at a particular time) and where I represents background information.

At 210, the likelihood P(D|X,I) is then assigned by taking the current probabilities of the individual reservoir models assigned at the values corresponding to the form of D (from 208), together with the constraint of range on allowed values for D (minimum and maximum) and the measurement D=<D>+/−$\sigma_D$ (from 204, 206), and the Maximum Entropy Assignment is then computed using Equation (2) shown above for the probabilities P(D|Xi, I).

More specifically, in at least some traditional approaches, the likelihood is evaluated from the available comb-function information (the separate probabilities). So-called "proxy model" approaches attempt to increase the number of available samples by interpolation or extrapolation (or both) and so the likelihood is evaluated over more points. In probability theory, all probabilities are assigned and the traditional approach is assigning the likelihood by performing the evaluation. However, embodiments in accordance with the present disclosure may recognize that all probabilities are assigned and that, additionally, it is meaningful to assign the most ambiguous probability distribution that is allowed under the constraint of the available information (i.e. the maximum entropy assignment). Thus, the conventional approaches may be replaced by a maximization of the information entropy, in which the likelihood function may be assigned by determining a value λ that maximizes the entropy. In at least some embodiments, this means we are assigning the largest ambiguity to the samples (i.e. largest standard deviation) under the constraint that the ambiguity is equal for all the samples.

It will be appreciated that since this can be reduced to the single observation calculation (n=1) it is possible to implement this scheme as a completely multithreaded or parallel approach, with every Maximum Entropy Assignment calculated separately. Where it is more computationally efficient to consider vectors this can also be done.

Moreover, each observation can be treated completely separately, in any order, and history matching, forecasting or estimation of current posterior probabilities of inputs can all be determined at any time. More specifically, in at least some embodiments, the history matching problem may be reduced to a set of separate 1-dimensional maximizations, one for each discrete observation (where an observation is a single value at a particular time and not a vector of values over all times). Consequently, this method is particularly suited to application in real-time reservoir monitoring and digital oilfield projects.

At 212, updates to the probabilities are computed using Bayes' Theorem (see Equation (1) above). In at least some embodiments, the probabilities in the denominator of Equation (1) are assumed to be held constant (i.e. P(D|I)=constant). The updated probabilities may be retained at 214 (e.g. stored in memory 120) for subsequent computations or analyses.

Thus, from the preceding discussion, it will be appreciated that methods and systems in accordance with the present disclosure take a substantially different approach than conventional methods and systems. More specifically, in at least some aspects, conventional methods attempt to approximate the continuous range of samples (Y) where the only available samples are a discrete subset Yi (e.g. increasing the number of samples Yi by adding interpolated values), and then calculate the probabilities Pi(Yi) on the combined set of original samples and pseudo-samples generated by the proxy, wherein the sum of these probabilities (e.g. a comb function) is assumed to be an approximation to the continuous probability distribution P(Y). Embodiments in accordance with the teachings of the present disclosure, however, take an alternate approach by considering the available samples Yi and their probabilities Pi(Yi) and assigning each available sample a continuous probability distribution Pi(Yi)+/−λ (where λ is determined by the maximum entropy assignment method). In at least some embodiments, the continuous probability distribution P(Y) is then approximated by the sum of these continuous distributions Pi(Yi)+/−λ.

A Numerical Example

For illustrative purposes, a relatively simple example will now be described. Consider a case having three samples Xi={$X_1, X_2, X_3$} that are equally probable in a prior, and that have been passed through a reservoir simulator to obtain three estimates at timestep k, $F_{ik}$={250, 100, 340} which are numbers in the same units as our observables (e.g. barrels per day). We will assume for purposes of this example that the observable can reasonably take any value between zero and 500.

The prior P(X|I) may be assigned to reflect many different uncertainties, often resulting in a highly complex, multi-parameter input set. Typically each uncertainty is characterized as a continuous distribution, however, they can also take the form of discrete alternatives and the use of the reservoir simulator, to provide the transfer function between input parameters and the time dependent observations of samples—the multiple realizations.

In arriving at the probability of a single observation (at timestep k), the background information I may contain a relationship f between parameters X and ideal data F (i.e. the reservoir simulator is given as background information). Now, in the case where the realizations $X_i$ form a mutually exclusive and exhaustive set, we can use the reservoir simulator to construct $F_i$ that exactly reproduce the relationship between parameters X and F. In general, however, we may not be able to sample the prior and run the simulator sufficiently to construct this relationship. Of course, any form of continuous prior could not be strictly sampled completely by a finite number of discrete samples, but this consideration becomes irrelevant (in at least this example) since we are only interested in sampling sufficiently to make inferences based on our observations D. In the assignment of the data's standard deviations, we know that there is a sampling of X that leads to an approximation of F that is closely spaced enough that our inference is not affected by further sampling. Thus, we are interested in what can be done in the case where sufficient sampling is not possible.

Figure 4:
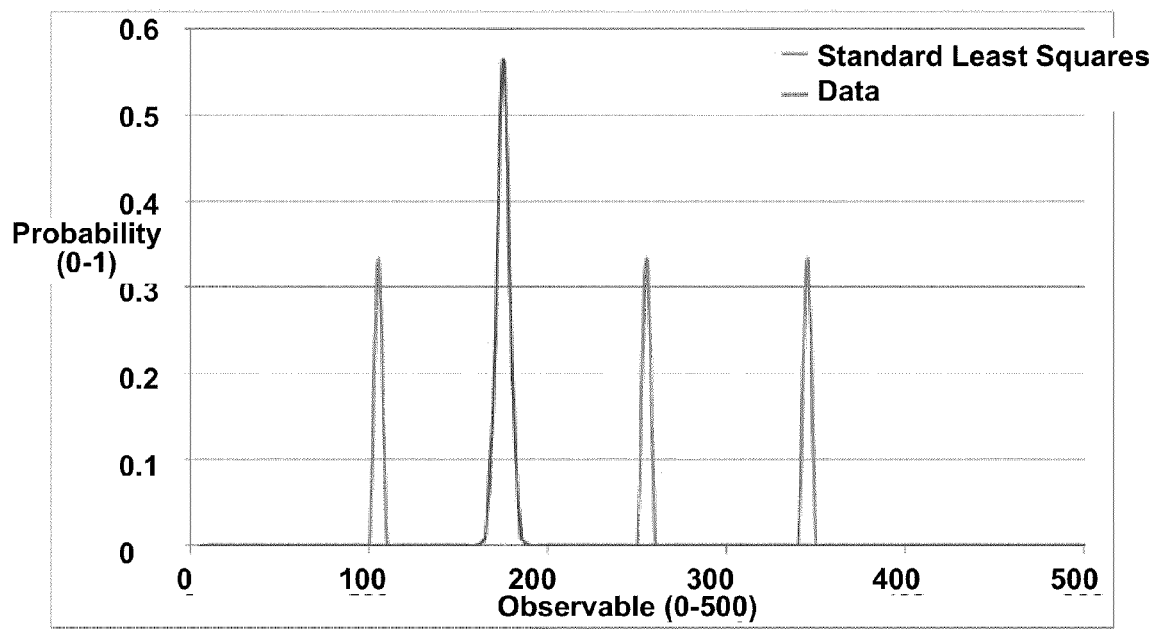
FIG. 4 shows a graphical comparison of a conventional least squares probability distribution and a Gaussian distribution associated with a data defined by a mean and standard deviation for a representative example in accordance with the teachings of the present disclosure.

We now receive the data point $D_k$=175+/−5, corresponding to a mean and standard deviation. In at least some conventional least squares methods, a likelihood function compares the Gaussian implied by $D_k$ to the comb function given by the simulator responses $F_{ik}$, as shown in FIG. 4. This is the implicitly assigned probability distribution we are using to approximate F. As shown in FIG. 4, in the case of relatively poor sampling of the prior, the standard least squares approximation provides three realizations forming a comb function with equally probable spikes. The narrow measurement error associated with the data $D_k$ indicates that none of the realizations of the standard least squares approximation are likely. The apparent non-zero width of the comb function spikes is an artefact due to numerical representation (400 points).

Figure 5:
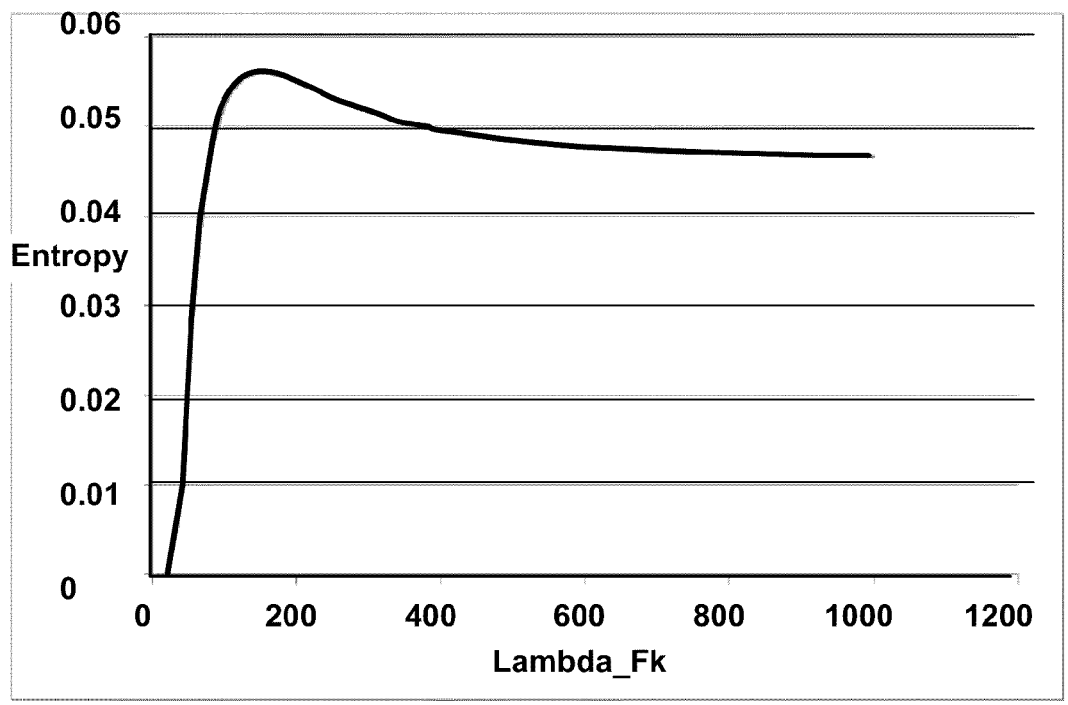
FIG. 5 shows entropy calculations for different values of $F_k$ for a representative example data having a standard deviation of +/−125 in accordance with the teachings of the present disclosure.

Entropy calculations for different values of $\lambda_{Fk}$ are shown in FIG. 5. The maximum entropy distribution may be constructed using the peak of this graph (e.g. $F_k$=150). In the maximum entropy approach, rather than the comb distribution, the probability distribution for F may be assigned by assuming $F_{ik}$={250+/−$\lambda_{Fk}$, 100+/−$\lambda_{Fk}$, 340+/−$\lambda_{Fk}$} and calculating $\lambda_{Fk}$ such that the entropy of the likelihood is maximized. FIG. 5 shows the entropy for various values of $\lambda_{Fk}$. The maximum entropy case corresponds to $\lambda_{Fk}$≈150.

Figure 6:
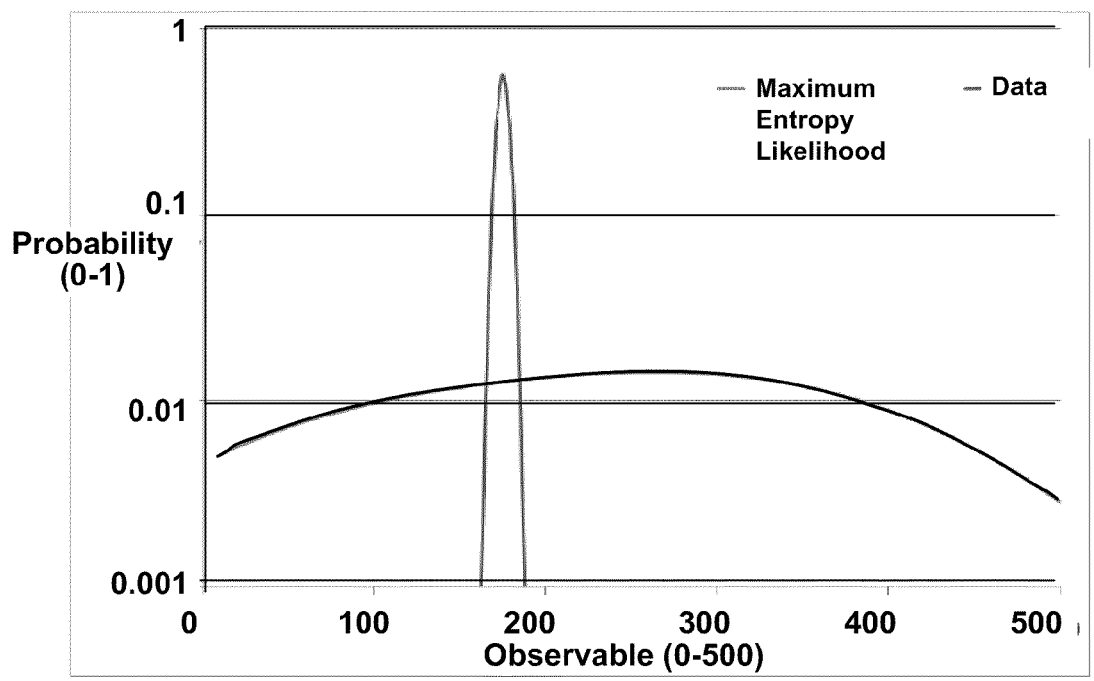
FIG. 6 shows a graphical comparison of a probability distribution determined using a maximum entropy technique and the Gaussian distribution associated with the data for a representative example in accordance with the teachings of the present disclosure.

Taking the maximum entropy case, we assign a much smoother probability distribution for F, as shown in FIG. 6. In this example, we are selecting a value of $\lambda_{Fk}$ to make the likelihood as ambiguous as our constraints allow. The likelihood is based on both the realizations F and the data D, so we expect both to influence the result.

Figure 7:
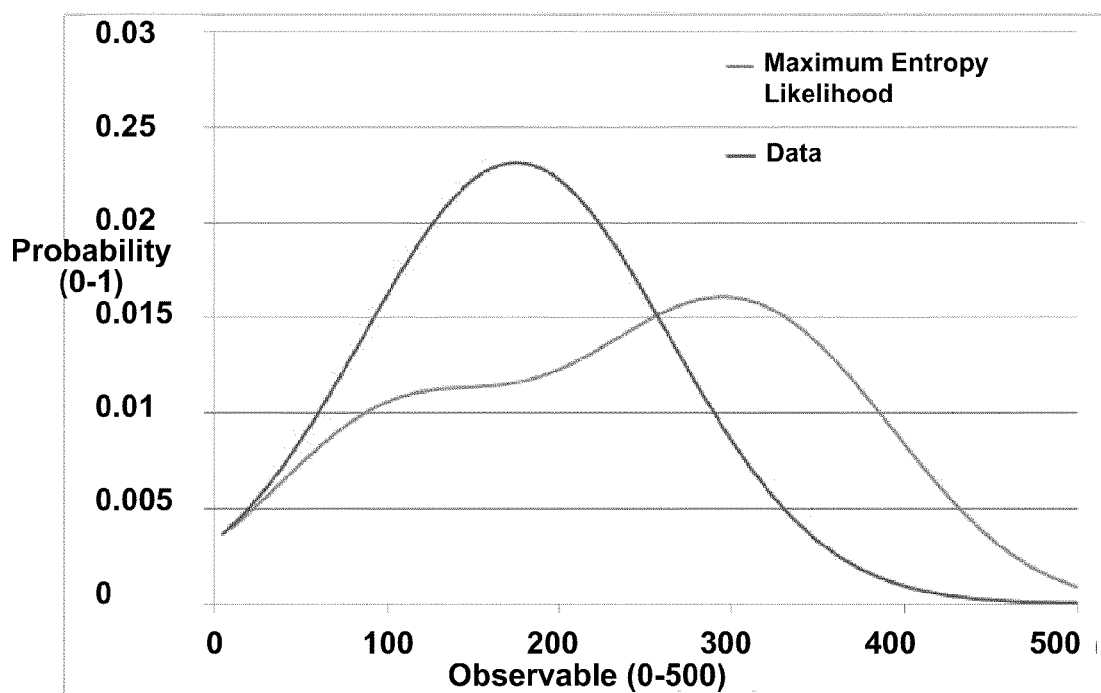
FIG. 7 shows entropy calculations for different values of $F_k$ for a representative example data having a standard deviation of +/−125 in accordance with the teachings of the present disclosure.
Figure 8:
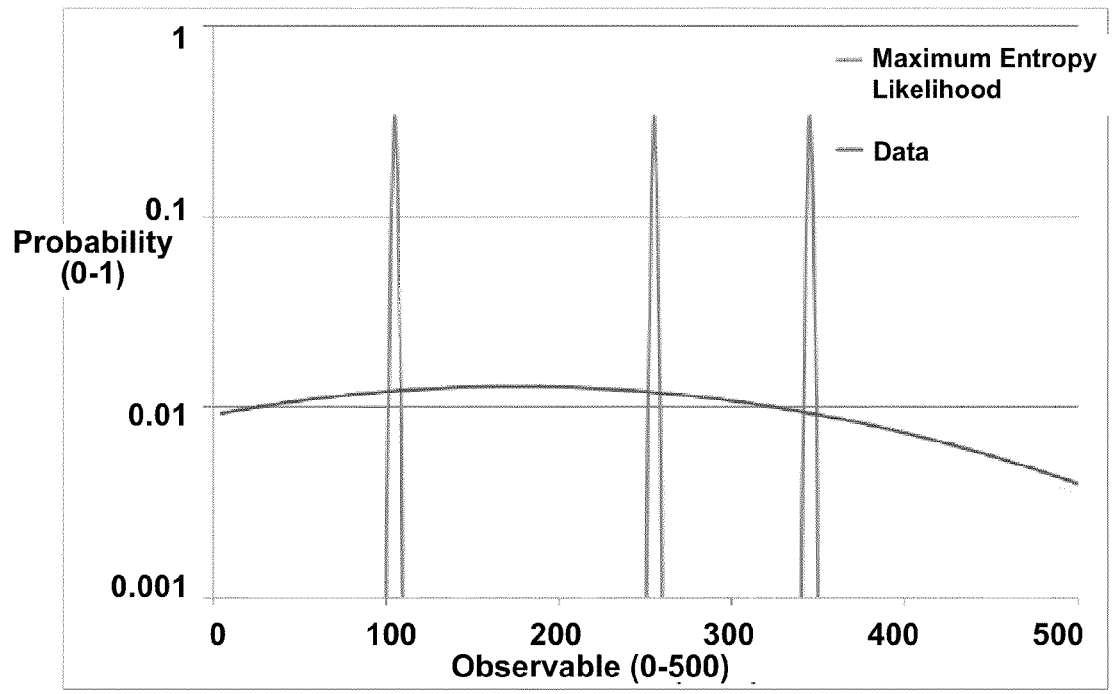
FIG. 8 shows entropy calculations for different values of $F_k$ for a representative example data having a standard deviation of +/−300 in accordance with the teachings of the present disclosure.

Indeed, it is the fine error range on the data point $D_k$ compared to the sparseness of our samples that leads to this very smooth distribution. FIG. 7 shows the maximum entropy case if the supplied data point were $D_k$=175+/−125, which results in a multimodal spectrum being assigned to F. As the measurement error assigned becomes larger than the sample spacing, we obtain entropy increasing with decreasing $\lambda_{Fk}$, recovering the comb function and direct application of least squares. For comparison, FIG. 8 shows the entropy variation with $\lambda_{Fk}$, given the data $D_k$=175+/−300. The probability values shown in FIG. 8 are on a logarithmic scale because the combined effect of such small measurement error and so few samples leads to a maximum entropy likelihood that is otherwise almost flat.

Referring again to FIG. 7, for the data having a measurement error of +/−125, the maximum entropy value of $\lambda_{Fk}$=100 is smaller than the measurement error and leads to a multimodal distribution for F. On the other hand, for the case of a measurement error +/−300 (FIG. 8), the measurement error is now large compared to the sample spacing and the maximum entropy estimate reduces approximately to a standard least squares solution.

History Matching

General reference to examples of history matching have been described above (with reference to FIGS. 1-3) as the updating of the probabilities of the existing set of reservoir models X using some observation(s) D. Additionally, in at least some embodiments, the history match result may be presented as the forecast of the dynamic properties of the reservoir over a history period.

Now we consider a specific case involving the application of the maximum entropy approach to a well-known literature example from "*Errors in History Matching*" by Tavassoli et al., SPE 86883, 2004). This example has been known to cause problems for current approaches (see "*How Does Sampling Strategy Affect Uncertainty Estimations?*" by D. Erbas and M. Christie, Oil and Gas Sci. And Tech., Rev. IFP, v62 (2), p. 155, 2007) which seek to find a "best fit."

Figure 9:
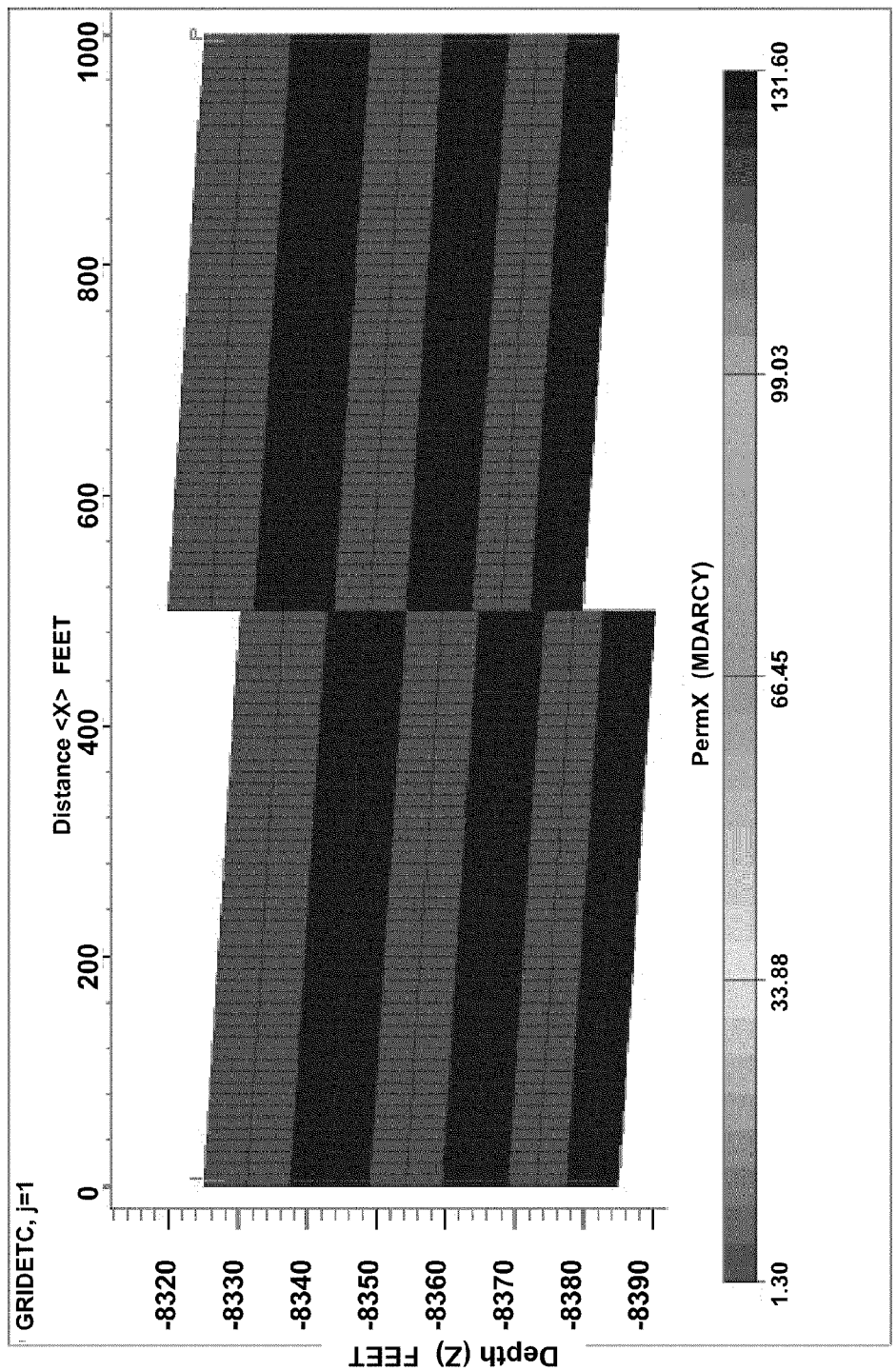
FIG. 9 shows an example two-dimensional model for conducting history matching computations in accordance with the teachings of the present disclosure.

Briefly, as shown in FIG. 9, the well-known literature example is a two-dimensional waterflood consisting of high and low permeability inter-bedded layers and a fault that lies midway between an injector and a producer. In this example, the injector is on the left, the model is two-dimensional, and there are only three input parameters: a high permeability, a low permeability, and a throw of the fault in the middle. A flat distribution is assumed for each parameter, within the ranges given in Table 1 below.

|  | High Permeability | Low Permeability | Throw |
| --- | --- | --- | --- |
| Max | 200 md | 50 md | 60 ft |
| Min | 100 md | 0 md | 0 ft |

Figure 10:
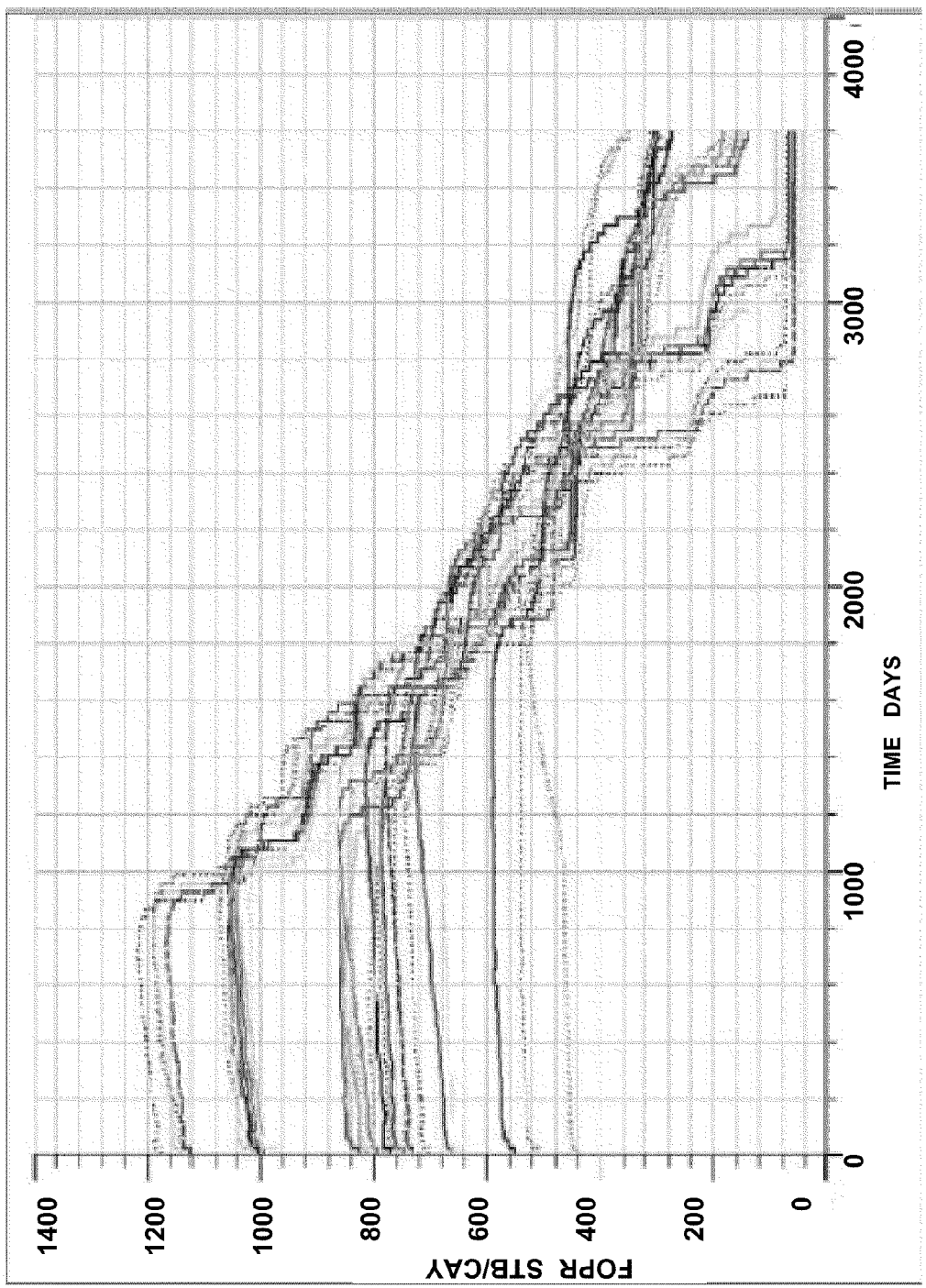
FIG. 10 shows a graphical representation of 30 samples of simulation results (production data) using the two-dimensional model of FIG. 9.
Figure 11:
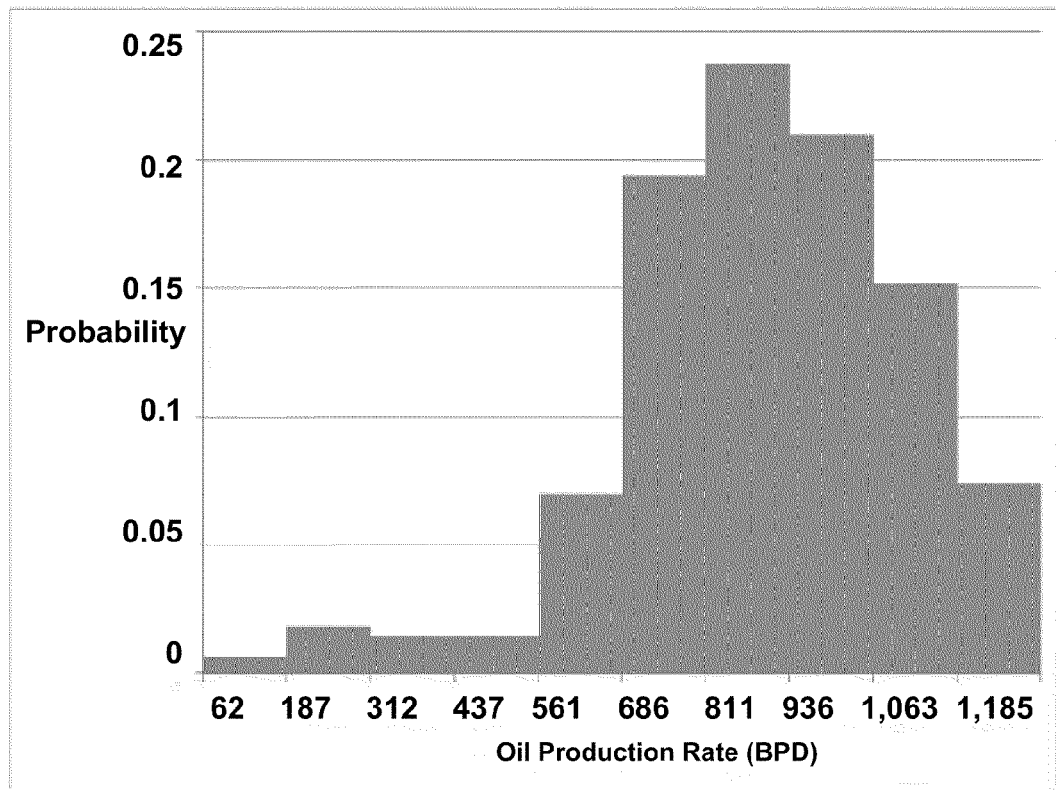
FIGS. 11 and 12 show histograms of expected oil production rates (based on 500 samples) at 600 days and 1800 days, respectively, for the two-dimensional model of FIG. 9.
Figure 12:
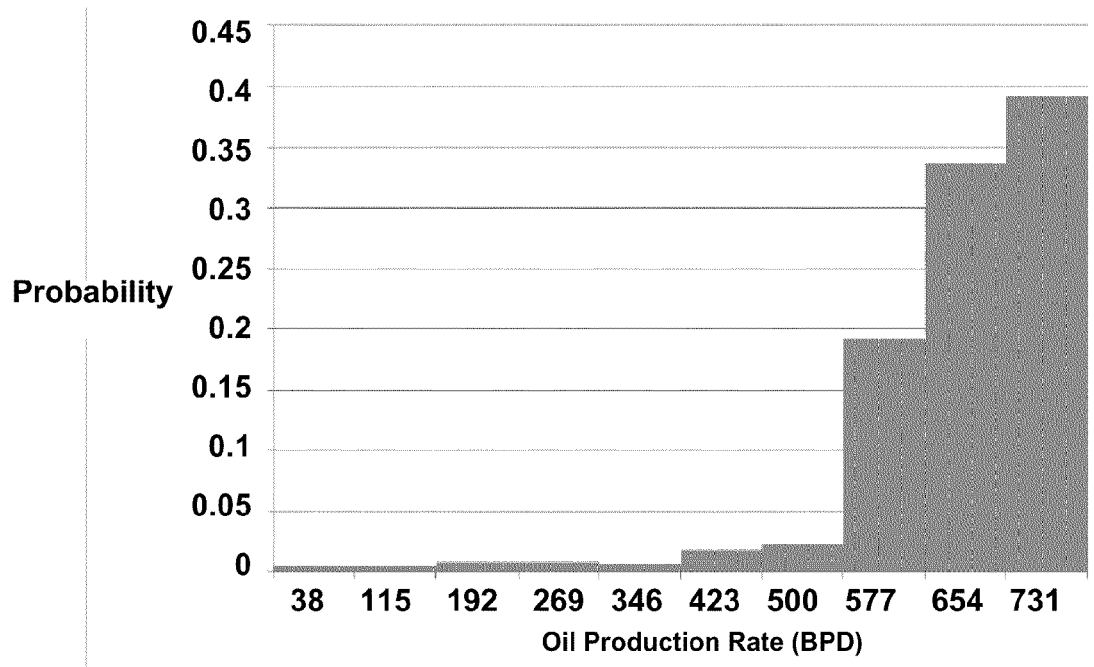

FIG. 10 shows a plot of 30 random samples of well production rate (WOPR) which provide an indication of the expected observed production, the results from simulations whose inputs were randomly sampled from the distributions given in Table 1. Similarly, histograms of expected oil production rates (based on 500 samples) at 600 days and at 1800 days are shown in FIGS. 11 and 12, respectively, which demonstrate that F is both non-Gaussian and time varying.

For the purpose of this illustration, the history match is made on the well's oil production and the observed data were assumed to be measured with a noise of 15 BPD. The result of the history match will be the expectation over the samples $F_{ik}$ and the standard deviations $S_k$. We assume that this is all the information that can be retrieved from our method and so, to determine alternative measures such as P10 and P90, we construct the maximum entropy likelihood given these two parameters. It is instructive to do this prior to history matching, when each $F_{ik}$ is assigned an equal probability.

Figure 13:
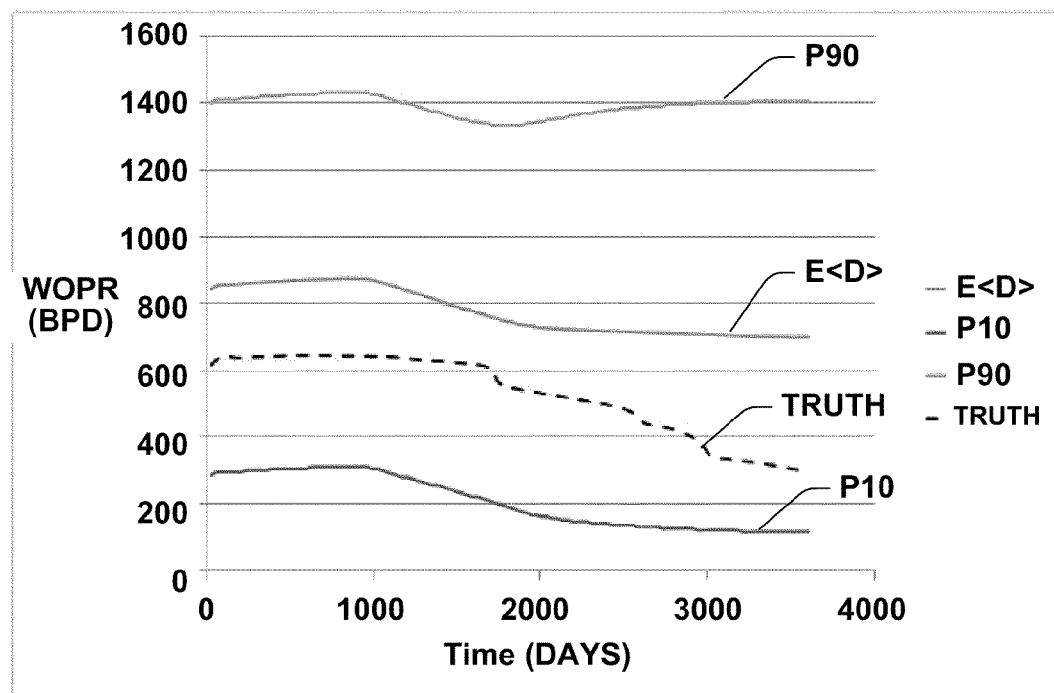
FIGS. 13 and 14 show a graphical comparison of production rate versus time for a 500 sample study based on a random sampling and a 27 sample study using the method proposed here, respectively, for the two-dimensional model of FIG. 9.

FIG. 13 shows a graphical comparison of production rate versus time for a 500 sample study for the two-dimensional model of FIG. 9. More specifically, FIG. 13 shows production predictions E<D>, P10 and P90 estimates, and a "truth" case. The predictions are over 500 samples, in which the first 27 samples are those from a sensitivity study, and the rest are randomly drawn. The predictions were calculated using the mean and standard deviation of the realizations. In this example, the sensitivity study is performed for each of the three input parameters having three values (low, middle, and high), making 27 combinations in all. The history match is made over the first 900 days, and the history and future are both calculated from the posterior probabilities of our sample set.

Figure 14:
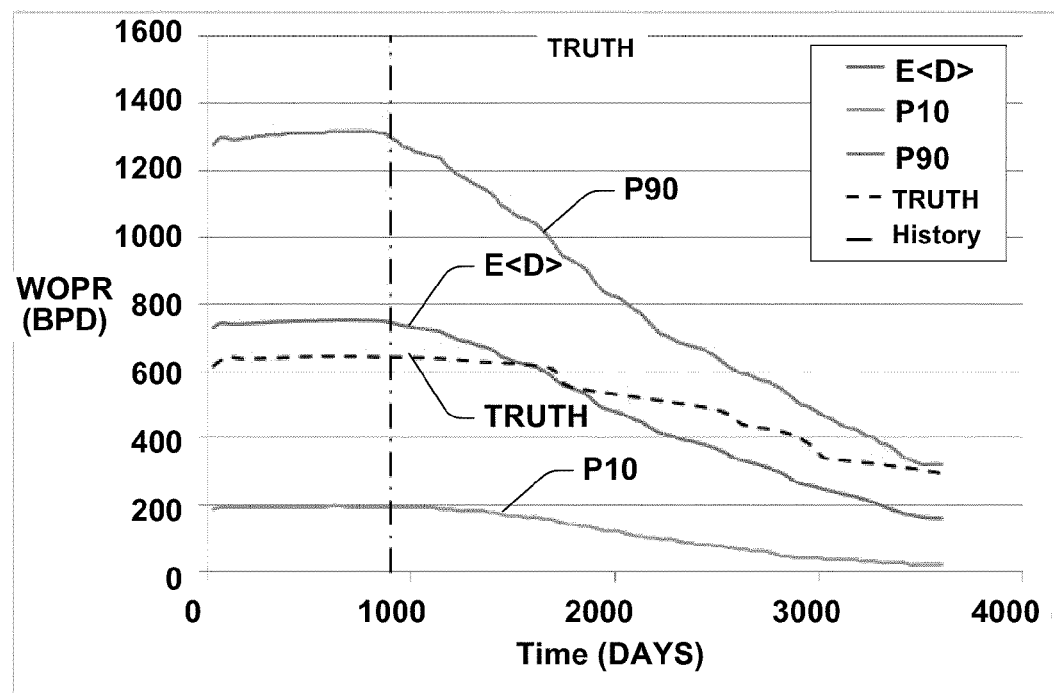

FIG. 14 shows a graphical comparison of production rate versus time for the 27 sample sensitivity study. Again, the production predictions E<D>, P10 and P90 estimates, and "truth" case are shown. These results show that a prediction period (post-900 days) is better constrained than the history, and that the spread in the samples themselves (FIG. 10) is wider for the early time portion than for the late time portion, leading to the narrower P10-P90 at late times.

Overall, the results of these studies (FIGS. 13 & 14) using the two-dimensional model of FIG. 9 show that thoughtful sampling typically offers excellent gains in multiple realization history matching compared the conventional methods. Conventional multiple realization history matching largely focuses on resolving the issue of sampling the prior because of the relatively high cost of evaluating each selected sample through the reservoir simulator. On the other hand, using the maximum entropy assignment of probability distributions in accordance with the teachings of the present disclosure has been shown to be highly effective and economical, even working with sparse samples. The maximum entropy assignment of probability distributions may advantageously provide the most ambiguous probability distribution that honors the supplied constraints. The method was found to give reasonable results and, as for other methods, is most efficient when some thought is put into how the prior is sampled (also called "experimental design" in the literature on history matching).

Forecasting

Any particular dynamic property of a reservoir can also be forecast using the Maximum Entropy Application technique in accordance with the teachings of the present disclosure. This includes, for example, a current forecast of an ensemble over the history period, and forecasting future reservoir performance.

More specifically, in some embodiments, the expectation over the ensemble can be constructed using the following Equations (3) and (4):

$$\langle X \rangle = \sum_{i=1}^{M} Pi(Xi) \quad (3)$$

$$\sigma_x = \sqrt{\sum_{i=1}^{M} (X_i - \langle X \rangle)^2} \quad (4)$$

where M is the number of realizations. The Maximum Entropy Assignment formulation in accordance with the present disclosure allows a fuller description of the forecast, covering the (possibly miltimodal) distribution in more detail, and allowing definition of the "P10" and "P90" estimates. The P10 and P90 estimates are commonly used in reservoir engineering studies and are generally understood to mean "I am 80% confident that the true value lies between the values P10 and P90", where it is customary that P10 is less than P90. This may be done by constructing a likelihood function, substantially as described above with reference to calculating probabilities, using the expectation <X> and standard deviation $\sigma_x$ in place of D. This provides a Maximum Entropy Assignment of the current estimate of the forecast, from which any description can be drawn, up to presenting an entire probability distribution.

Describing the Posterior on Reservoir Input Parameters

A posterior distribution for any reservoir input parameter(s) can be constructed in substantially the same way as the forecast described above. The term "posterior distribution" is used herein, as it is commonly used in statistics, to refer to a probability distribution after all the information has been processed (i.e. a complete result of the study). This result is then summarized by the most likely result (expectation), confidence interval (e.g. P10 and P90) or some other reduction (e.g. a mean and standard deviation, etc.). The posterior distribution is the full result, which may have many peaks (multimodal) and summarized results are typically only approximations to this.

Again, starting with the current ensemble and constructing the likelihood function, constrained by the ensemble expectation and standard deviation. Embodiments of this approach can be used to determine correlations between input parameters or to establish whether some input parameters provide multimodal distributions. It can also be used to estimate the current most likely value(s) of the input parameter, which might be used in defining new reservoir models to add to the ensemble.

Adding a New Reservoir Model

It may be desirable to add a new reservoir model to an existing ensemble. In such cases, the posterior on any given reservoir input parameter, or the current forecast of any dynamic parameter, can be calculated using the Maximum Entropy Assignment of the likelihood function (as described above). Each calculation of a posterior or forecast provides a probability of the new reservoir model. Using one or more such calculations, an estimate for the probability of the new sample can be determined from the existing set (e.g. an average over all possible inputs and forecasts may completely determine the assignment, an approximate assignment can be made using any subset).

Working with Multiple Scale Models

Reservoir models on any scale can be handled since the probability updates are made on a defined parameter (e.g. history match on a particular observation). This means that the ensemble may include different resolutions (coarser and finer) without any need to upscale or downscale between particular cases. Where a particular model is a poor representation of the reservoir it will end up assigned a low probability using maximum entropy assignment of probabilities in accordance with the teachings of the present disclosure.

Developing Field Development Plans

It may be valuable to have a small number of actual reservoir simulation models for the development of field development plans. Using embodiments in accordance with the present disclosure, it is possible to select particular models from the ensemble by considering their probabilities directly (e.g. ranking on $P_i(X_i)$). Once the planned operations are designed, they would ideally be run over the whole ensemble (although using a sub-set is also possible as described below) to provide the ensemble forecasts.

Working with an Ensemble Sub-Set

In much detailed reservoir engineering there is a requirement for sector models and near-well models that are used to interpret particular regions of the reservoir. In such situations, it is possible to introduce the local models using the operations described above for adding a new reservoir model, as for any full-field model.

Of course such sector models may generally not extend to the whole field and, when another sector is studied (a region of the reservoir excluded in the earlier sector model study), only a subset of the total ensemble may have representations corresponding to the new data. In such cases, the sub-set can only tell us about their relative probabilities and the total probability of that subset with respect to the total ensemble is unchanged.

In practice this means that the probabilities of the sub-set are normalized by $1-P_{others}$, where $P_{others}$ is the sum of the probabilities of the reservoir models that are excluded from the current study. Note that the same approach may be applied to presenting results of forecasts from a subset of the ensemble—the prediction of a Field Development Plan, for example, may be made over only a limited number of reservoir models and this will be reflected in the declaration of the results (i.e. the integral of probability will be $1-P_{others}$).

In general, embodiments of systems and methods in accordance with the present disclosure may advantageously use a maximum entropy approach to assigning probabilities, enabling the most ambiguous form of probability assignment to be provided under constraints. Such embodiments may therefore allow analysts to correctly accommodate the limited number of realizations that are able to be run, and to properly assign ignorance of the values that lie between, as described more fully below.

In at least some embodiments, methods and systems using the maximum entropy approach in accordance with the teachings of the present disclosure may be achieved in a fully separable way that is suitable for multi-threaded implementation, an parallel processing. Similarly, at least some embodiments may be used for real-time updating of the history match, and may accommodate the introduction of additional realizations without any need for repeating past analysis. Additionally, at least some embodiments can incorporate information from models on any scale.

In general, unless otherwise stated herein, one or more of the components (or portions) of the systems and methods disclosed herein may be variously combined with one or more other components (or portions), or eliminated, to provide further embodiments in accordance with the teachings of the present disclosure. Also, it will be appreciated that, unless otherwise stated herein, one or more of the components of the systems and methods disclosed herein may include (or be composed of) conventional components.

Although embodiments of methods and systems that use a maximum entropy approach to assigning probabilities in accordance with the teachings of the present disclosure have been described in language specific to structural features and/or methods, it is to be understood that the subject of the appended claims is not necessarily limited to the specific features or methods described above. Rather, the specific features and methods are disclosed as exemplary implementations to provide an understanding of such embodiments, and to provide support for the claims that follow.

What is claimed is:

1. A method, comprising:
obtaining available sample values Yi associated with a reservoir;
computing, using a computing device, a maximum entropy assignment λ of one or more discrete probabilities Pi(Yi) each of the discrete probabilities Pi(Yi) associated with one or more of the available sample values Yi, where each of the discrete probabilities Pi(Yi) represents a probability that one or more variables Y will take a set of particular values Yi; and
performing at least one determination regarding the reservoir using the maximum entropy assignment λ and the computing device, including approximating a continuous probability distribution P(Y) using a sum of probability distributions Pi(Yi)+/−λ.

2. The method of claim 1, wherein performing at least one determination regarding the reservoir using the maximum entropy assignment λ and the computing device includes:
performing a multiple realization history matching using the continuous probability distribution P(Y).

3. The method of claim 1, wherein performing at least one determination regarding the reservoir using the maximum entropy assignment λ and the computing device includes:
updating one or more of the discrete probabilities Pi(Yi) corresponding to one or more of the available sample values Yi associated with the reservoir using one or more of the probability distributions Pi(Yi)+/−λ.

4. The method of claim 1, wherein computing the maximum entropy assignment λ includes:
assigning a likelihood by combining the discrete probabilities Pi(Yi) with a constraint range associated with at least one of the available sample values Yi or one or more observed values.

5. The method of claim 1, wherein computing the maximum entropy assignment λ includes:
assuming one or more of the discrete probabilities Pi(Yi) are represented using:

$$P(X \mid D, I) = \frac{P(D \mid X, I) P(X \mid I)}{P(D \mid I)},$$

where P( ) represents one or more probabilities, D represents one or more observations, X represents one or more inputs, and I represents initial known parameters.

6. The method of claim 1, wherein computing the maximum entropy assignment λ includes:
computing the maximum entropy assignment λ such that the following equation is maximized:

$$S_Y = -\sum_i P_i(Y_i) \ln(P_i(Y_i)).$$

where $S_Y$ is entropy.

7. The method of claim 1, wherein computing the maximum entropy assignment λ includes:
assuming one or more of the discrete probabilities Pi(Yi) are represented using:

$$P(X \mid D, I) = \frac{P(D \mid X, I) P(X \mid I)}{P(D \mid I)},$$

where X represents one or more forecasting inputs, I represents initial known parameters, and D is a standard deviation σX given by:

$$\sigma_X = \sqrt{\sum_{i=1}^{M}(X_i - \langle X \rangle)^2},$$

where M is a number of realizations, and where an expectation <X> is given by $$\langle X \rangle = \sum_{i=1}^{M} P_i(X_i),$$

where Pi where Pi represents a probability that a set of forecasted variables X take a set of particular values Xi.

8. The method of claim 1, further comprising:
obtaining one or more observed values from observed information associated with operation of the reservoir; and
obtaining one or more current probabilities corresponding to one or more of the available sample values Yi.

9. The method of claim 1, wherein performing at least one determination regarding the reservoir using the maximum entropy assignment λ and the computing device includes:
performing at least one of a history matching, a forecast, a posterior distribution, a plan, or an ensemble sub-set of one or more variables associated with operation of the reservoir using the continuous probability distribution P(Y) approximated using the sum of probability distributions Pi(Yi)+/−λ.

10. The method of claim 1, wherein approximating a continuous probability distribution P(Y) using a sum of probability distributions Pi(Yi)+/−λ comprises:
transforming the continuous probability distribution P(Y) by substituting the sum of probability distributions Pi(Yi)+/−λ.

11. The method of claim 1, comprising obtaining one or more of the available sample values Yi by:
obtaining at least one first sample value having a first scale and obtaining at least one second sample value having a second scale.

12. One or more computer-readable non-transitory storage media containing instructions that, when executed by a computer, perform a method comprising:
determining a maximum entropy assignment λ of probabilities Pi(Yi) associated with one or more reservoir operation variables, including assigning a likelihood by combining one or more of the probabilities Pi(Yi) with a constraint range associated with at least one of the one or more reservoir operation variables;
for each of the probabilities Pi(Yi), determining a corresponding probability distribution Pi(Yi)+/−λ; and
performing at least one determination regarding one or more reservoir operation variables using the maximum entropy assignment λ wherein performing at least one determination regarding one or more reservoir operation variables using the maximum entropy assignment λ includes approximating a continuous probability distribution P(Y) using a sum of the probability distributions Pi(Yi)+/−λ.

13. The one or more computer-readable non-transitory storage media of claim 12, wherein performing at least one determination regarding the reservoir using the maximum entropy assignment λ includes:
performing a multiple realization history matching using one or more probabilities associated with the reservoir operation computed using the maximum entropy assignment λ.

14. The one or more computer-readable non-transitory storage media of claim 12, wherein performing at least one determination regarding the reservoir using the maximum entropy assignment λ includes:
developing at least part of a field development plan using one or more probabilities computed using the maximum entropy assignment λ.

15. One or more computer-readable non-transitory storage media containing instructions that, when executed by a computer, perform a method comprising:
reducing a multiple realization history matching model of a hydrocarbon reservoir having a plurality of variables to a set of separate one-dimensional maximizations, each one-dimensional maximization corresponding to a discrete observation of a particular variable at a particular time; and
performing an estimation of at least one variable of the plurality of variables of the hydrocarbon reservoir using the set of separate one-dimensional maximizations.

16. The one or more computer-readable non-transitory storage media of claim 15, wherein reducing a multiple realization history matching model of a hydrocarbon reservoir having a plurality of variables to a set of separate one-dimensional maximizations includes:
computing a maximum entropy assignment of one or more probabilities associated with one or more of the plurality of variables associated with the hydrocarbon reservoir.

\* \* \* \* \*